Dec. 11, 1956     A. MOELLER     2,773,619
SEWER PLUG STOPPER
Filed July 21, 1954

INVENTOR
AXEL MOELLER

BY

*Young and Wright*
ATTORNEYS

United States Patent Office 2,773,619
Patented Dec. 11, 1956

2,773,619

SEWER PLUG STOPPER

Axel Moeller, Racine, Wis., assignor to Moeller Manufacturing Co., Inc., Racine, Wis., a corporation Application July 21, 1954, Serial No. 444,818

1 Claim. (Cl. 220—24.5)

This invention appertains broadly to compressible stoppers or closures and more particularly to an improved stopper especially adapted for sealing sewer drain pipes in cellars and basements.

In many localities, after heavy or continued rains, water backs up in the sewer pipes and floods basements and cellars causing great damage. I have found that this flooding can be effectively prevented by sealing the sewer at the drain bowl, if the seal can hold its seat against the pressure of the water.

One of the primary objects of my present invention is to provide an improved stopper, which can be readily inserted in and removed from a drain bowl and drain pipe and which embodies a compressible body that can be expanded tight in place for producing an effective seal and for withstanding pressure acting against the same.

Another salient object of my invention is to provide a stopper embodying a compressible body confined between a pair of compression plates with means including a threaded stem carried by the lower plate and a nut threaded on the stem bearing against the upper plate for bringing about longitudinal compression of the body and the radial expansion thereof; the stem and lower plate being carried by the body in a novel manner whereby separation of these parts is prevented, so that the stem and lower plate cannot drop and be lost in the sewer drain.

A further object of my invention is the provision of an extension sleeve on the lower end of the nut rotatably received in the upper plate forming means for centering the nut and plate relative to the body and for preventing the plate from stripping the threads on the stem, the extension sleeve also defining a stop and bearing shoulder for engaging the upper plate.

A further important object of my invention is the provision of an annular groove formed in the stop and bearing shoulder for receiving a lubricant and for reducing the bearing surface and hence friction between the nut and upper plate.

Another further object of my invention is the use of a stainless steel washer between the shoulder and upper plate to reduce rusting of parts and to further decrease friction.

Another further important object of the invention is the provision of a tapered flange on the upper end of the compressible body for insuring a top seal with the drain bowl and pipe irrespective of any irregularities of contour therein.

A still further object of my invention is to provide an auxiliary sleeve externally threaded for connection with the drain pipe for receiving the stopper and thus insure a proper and desired seal between the stopper and drain pipe.

A still further important object of the invention is to improve the stoppers shown in my following patents and applications, whereby such stoppers can be effectively used on sewer drain pipes to the best of advantage; Patent No. 2,292,149 issued August 4, 1942; Patent No. 2,315,538 issued April 6, 1943; Patent No. 2,347,835 issued May 2, 1944; allowed applications Serial Numbers 184,609 and 184,610 both filed September 13, 1950, now Patents Nos. 2,685,379 and 2,685,380 respectively, and pending application Serial Number 310,496 filed September 19, 1952, now Patent No. 2,729,353.

With these and other objects in view, the invention consists in the novel construction, arrangement and formation of parts, as will be hereinafter more specifically described and claimed and illustrated in the accompanying drawing, in which drawing:

Referring to the drawing in detail, wherein similar reference characters designate corresponding parts throughout the several views, the letter D generally indicates my improved sealing device for a drain bowl B and sewer drain pipe P.

Figure 1:
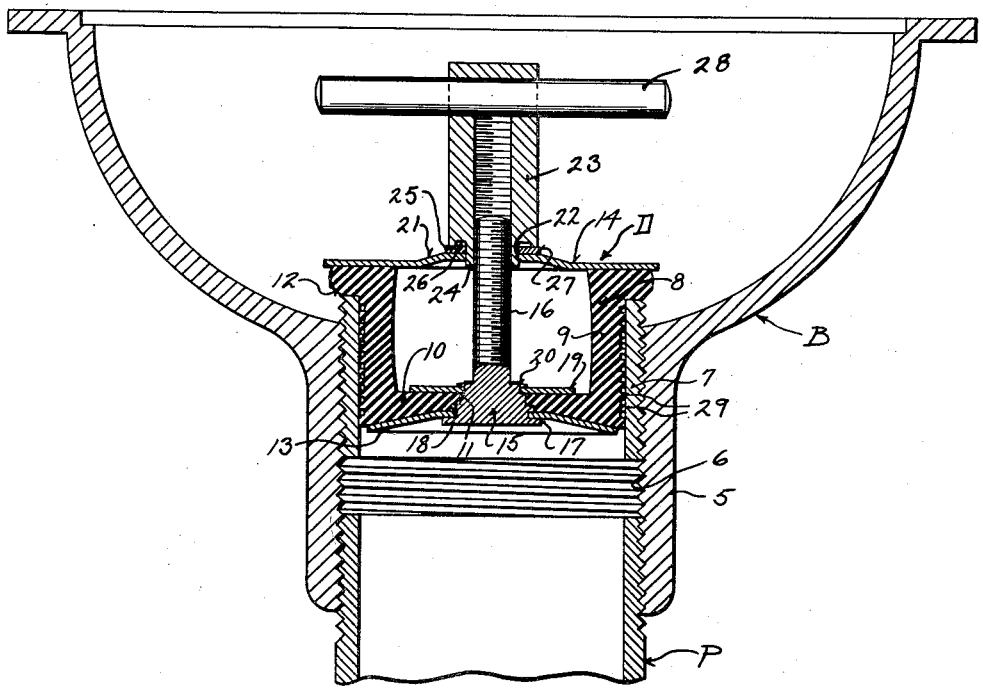
Figure 1 is a vertical sectional view through a sewer drain bowl and pipe showing my improved sealing device incorporated therewith and in its sealing position, the sealing device being also shown in central vertical section.

The bowl B and the pipe P can be considered as a type now commonly employed in the cellars and basements of homes and buildings and it is to be noted that the bowl is provided with an axially disposed depending sleeve 5 internally threaded, as at 6, for the reception of the pipe P. The bowl B and its sleeve 5 are of a type for receiving a two inch drain pipe, and in this particular type of bowl the sleeve 5 is generally of a thin character and due to the fact that the bowl and its sleeve are formed from a single casting, irregularities often appear therein. In order to insure a good seal with my device D and to strengthen the sleeve 5, I can and preferably employ an externally threaded nipple 7 for receiving the sealing device D. This nipple can be threaded into the sleeve 5 above the pipe P and it is to be noted that the nipple has a smooth interior.

Now referring to the sealing device D the same includes a compressible resilient body 8 preferably formed from rubber and this compressible body includes an annular side wall 9 and a relatively thin bottom wall 10. The bottom wall is provided with an axially disposed opening 11. The side wall at its upper end is provided with a tapering flange 12 for a purpose, which will later appear.

The compressible body 8 is confined between a lower compression plate 13 and an upper compression plate 14, and these plates are constructed in such a manner as will now be described. The lower compression plate 13 is preferably of a concavo-convex form and receives the head 15 of an axially disposed stem 16. The head 15 is flanged over the upper and lower surfaces of the plate 13, as indicated respectively by the reference characters 17 and 18. The stem extends through the opening 11 in the bottom wall 10 and fitted around the stem and against the inner surface of the bottom wall 10 is a washer 19. The stem is peened, as at 20, at spaced points against the washer, whereby the stem and the compression plate 13 will be securely united with the body 8 to prevent separation of these parts. This effectively prevents the loss of the stem and bottom plate in the drain pipe. The stem 16 is externally threaded and preferably extends a slight distance above the upper surface of the body 8.

The top plate 14 is in the nature of a disc and is of such a diameter as to completely overlie the upper end of the stopper. The central portion of the plate is slightly domed, as at 21, and is provided with an axial opening 22.

Figure 2:
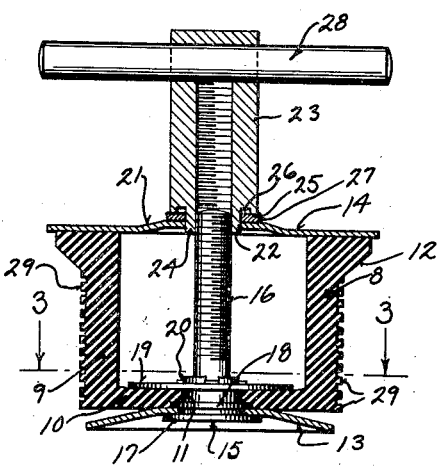
Figure 2 is a central vertical sectional view through my improved sealing device removed from the drain bowl and showing the device in its released non-compressed position.
Figure 3:
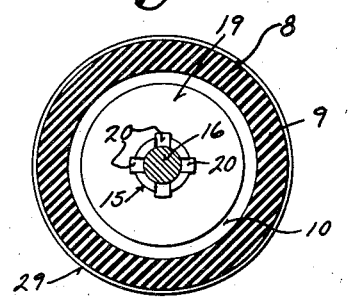
Figure 3 is a horizontal sectional view through the device taken on the line 3—3 of Figure 2, looking in the direction of the arrows.

In conjunction with the threaded portion of the stem 16 and the plate 14, I utilize an elongated internally threaded nut 23. This nut is threaded on the stem 16, as best shown in Figures 1 and 2. The lower end of the elongated nut 23 is provided with an extension sleeve 24 of a less diameter than the external diameter of the nut, and this sleeve extends through the opening 22 in the plate 14 and functions to center the nut and plate relative to one another and to prevent the plate from stripping the threads on the stem 16. The sleeve 24 also defines a lower stop and bearing shoulder 25 and this bearing shoulder in turn is provided with an annular groove 26. The groove 26 reduces the bearing area of the shoulder and consequently, friction between adjacent parts, and this groove is packed with a lubricant. Interposed between the shoulder 25 and the domed portion 21 of the plate 14 is a stainless steel bearing washer 27, and this bearing washer also functions to reduce friction and to decrease rusting of parts. The nut 23 can be made to facilitate the ease of turning thereof by hand, and in the instant showing I have provided a cross handle 28 for this purpose.

The stopper or sealing device D itself can be inserted directly in the bowl and the sleeve 5 for sealing the same and in this instance the tapered flange 12 on the compressible body forms means for sealing the edge of the bowl around the sleeve and this flange will conform itself to any irregularities in the surface of the casting. When the stopper is inserted in the sleeve with the flange 12 against the bowl, it is merely necessary to turn the nut 23 by the handle 28 until the compressible body 8 is longitudinally compressed and the body will be radially expanded into tight and intimate contact with the sleeve. It is to be noted that the outer surface of the side wall 9 of the body 8 is provided with equidistantly spaced annular sealing ribs 29 in accordance with my Patent No. 2,315,538.

I preferably use in conjunction with my improved stopper or sealing device D the nipple 7 heretofore mentioned in that the nipple will strengthen the sleeve 5. This nipple can easily be placed in position in the sleeve 5 without the use of special tools and to accomplish this, I preferably expand the stopper in the nipple and then thread the stopper and nipple as a unit in the sleeve 5.

Changes in details may be made without departing from the spirit or the scope of this invention, but what I claim as new is:

An expansion stopper for sealing sewer drain bowls comprising a compressible resilient body having an annular side wall and a bottom wall provided with an axially disposed aperture, upper and lower compression plates fitted against the upper and lower surfaces of the body, an axially disposed threaded stem rigidly secured to the lower plate and extending toward the upper plate through the aperture in the bottom wall of the body, said upper plate having an axially disposed opening, an elongated nut threaded on the stem engaging the upper plate having an axially disposed depending sleeve extension extending through the opening in the upper plate for centering the nut and upper plate relative to one another and to prevent the stripping of the threads on the stem by the upper plate, a washer fitted on the stem against the upper surface of the bottom wall of the body and secured rigidly to the stem, whereby inadvertent displacement of the stem and lower plate from the body is prevented, and an annular tapered flange extending outwardly from the side wall of the body.

References Cited in the file of this patent
UNITED STATES PATENTS

| | | |
|---|---|---|
| 279,455 | Stahlin | June 12, 1883 |
| 288,885 | Stahlin | Nov. 20, 1883 |
| 2,003,770 | Goodhart | June 4, 1935 |
| 2,107,939 | Hartnock | Feb. 8, 1938 |
| 2,324,545 | Svirsky | Jan. 20, 1943 |
| 2,685,379 | Moeller | Aug. 3, 1954 |